United States Patent
Kaiser et al.

(10) Patent No.: US 9,601,976 B2
(45) Date of Patent: Mar. 21, 2017

(54) METHOD FOR INJECTION MOLDING ROTOR MAGNETS

(71) Applicant: GM GLOBAL TECHNOLOGY OPERATIONS LLC, Detroit, MI (US)

(72) Inventors: Edward L. Kaiser, Orion, MI (US); Amanda Luedtke, Berkley, MI (US); Peter J. Savagian, Bloomfield Hlls, MI (US); Sinisa Jurkovic, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 124 days.

(21) Appl. No.: 14/251,688

(22) Filed: Apr. 14, 2014

(65) Prior Publication Data

US 2014/0338184 A1   Nov. 20, 2014

Related U.S. Application Data

(60) Provisional application No. 61/824,565, filed on May 17, 2013.

(51) Int. Cl.
*H02K 15/02* (2006.01)
*H02K 15/10* (2006.01)
*H02K 15/03* (2006.01)

(52) U.S. Cl.
CPC ........ *H02K 15/03* (2013.01); *Y10T 29/49012* (2015.01); *Y10T 29/53143* (2015.01)

(58) Field of Classification Search
CPC ....... B22F 3/12; H02K 1/02; Y10T 29/49012; Y10T 29/49009; Y10T 29/49803; Y10T 29/53143; H01F 13/003

USPC ..... 29/598, 419.2, 596, 607, 732; 419/5, 12, 419/26, 38, 39, 44, 66
See application file for complete search history.

(56) References Cited

U.S. PATENT DOCUMENTS

| | | | |
|---|---|---|---|
| 4,760,300 A | 7/1988 | Yoshida et al. | |
| 5,538,067 A | 7/1996 | Nakamura et al. | |
| 6,684,483 B2 * | 2/2004 | Rahman | H02K 15/03 29/419.2 |
| 7,524,453 B2 * | 4/2009 | Ugai | B22F 3/03 419/38 |

FOREIGN PATENT DOCUMENTS

| | | |
|---|---|---|
| CN | 1178146 A | 4/1998 |
| CN | 1340898 A | 3/2002 |
| JP | 2008172965 A | 7/2008 |
| JP | 2012161209 A | 8/2012 |
| JP | 5077167 B2 | 11/2012 |

\* cited by examiner

*Primary Examiner* — Thiem Phan
(74) *Attorney, Agent, or Firm* — Quinn Law Group

(57) ABSTRACT

A method and assembly for forming a rotor include forming a rotor core having a plurality of voids and placing the formed rotor core into a die cavity. The method includes moving a plurality of support shoes to define an outer diameter of the die cavity, and injecting at least one of the plurality of voids with a magnetic slurry. At least one permanent magnet is formed from the magnetic slurry by applying pressure to the rotor core and the magnetic slurry within the die cavity and by applying a magnetic field to align the magnetic slurry. After forming the at least one permanent magnet within the rotor core, the plurality of support shoes are retracted and the rotor core removed with the at least one permanent magnet formed therein.

5 Claims, 2 Drawing Sheets

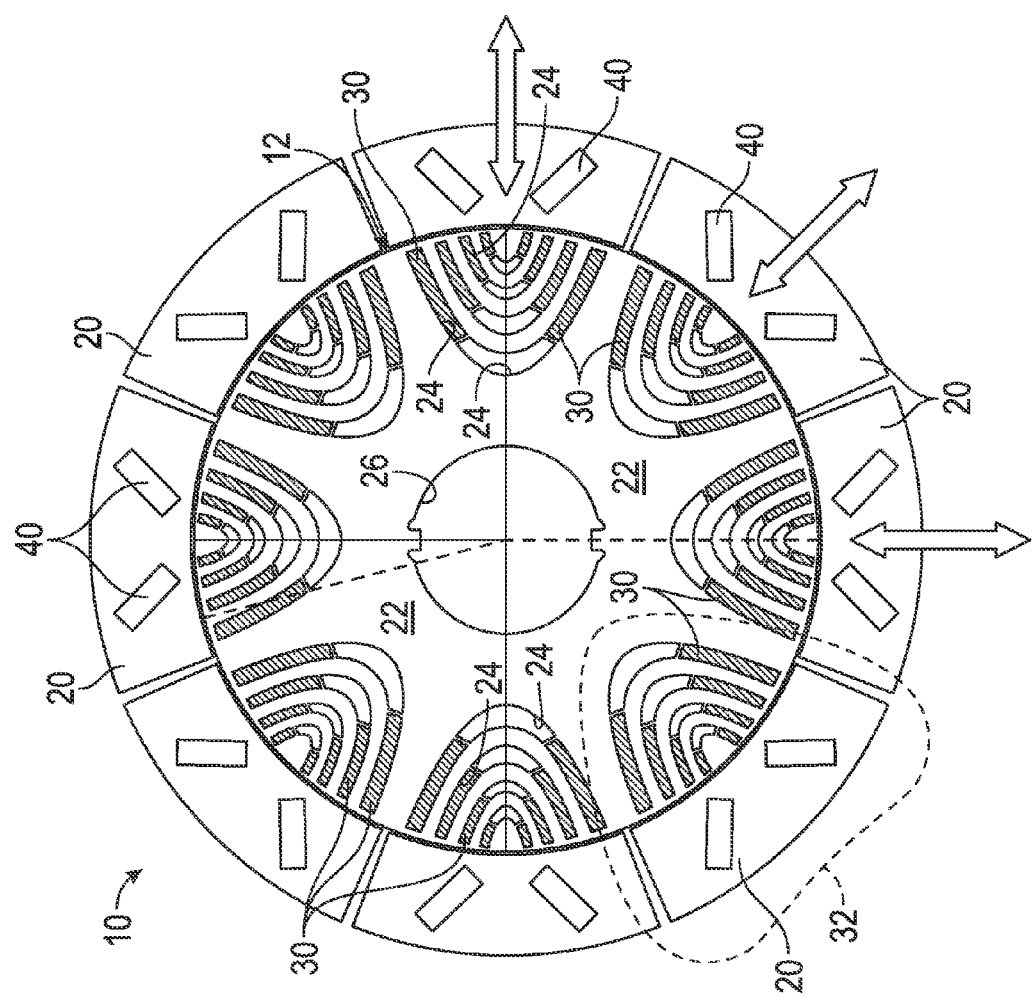
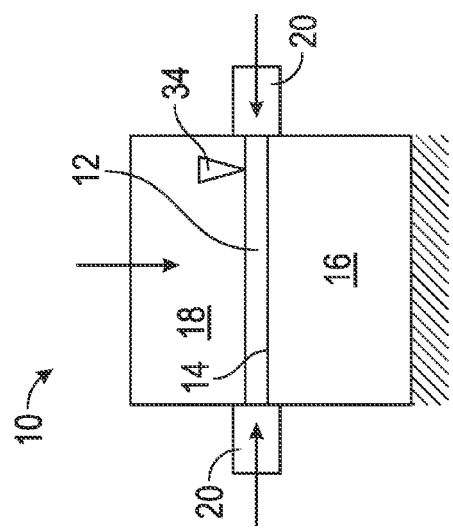
FIG. 1B
FIG. 1A

METHOD FOR INJECTION MOLDING ROTOR MAGNETS

CROSS-REFERENCE TO RELATED APPLICATIONS

This application claims the benefit of U.S. Provisional Application No. 61/824,565, filed May 17, 2013, which is hereby incorporated by reference in its entirety.

TECHNICAL FIELD

This disclosure relates to rotors for electric machines and, more particularly, to methods of forming such rotors.

BACKGROUND

A stator is the stationary part of an electric machine. The stator interacts with a rotor, which is the moving or rotating part of the electric machine. The stator and rotor allow the electric machine to convert mechanical energy to electrical energy, which may be referred to as a generator mode, and to convert electrical energy to mechanical energy, which may be referred to as a motor mode.

SUMMARY

A method for forming a rotor is provided. The method includes forming a rotor core having a plurality of voids and placing the formed rotor core into a die cavity. The method also includes moving a plurality of support shoes to define an outer diameter of the die cavity.

The method also includes injecting at least one of the plurality of voids with a magnetic slurry, and forming at least one permanent magnet from the magnetic slurry within the at least one of the plurality of voids. The at least one permanent magnet is formed by applying pressure to the rotor core and the magnetic slurry within the die cavity and by applying a magnetic field to align the magnetic slurry.

After forming the at least one permanent magnet within the rotor core, the method includes retracting the plurality of support shoes. The rotor core may then be removed with the at least one permanent magnet formed therein.

An assembly for forming injection molded magnets in permanent magnet rotors or laminations for such rotors is also provided. The assembly includes a plurality of platens defining an axial boundary of a die cavity and a plurality of support shoes that are radially moveable between a closed position defining a radial boundary of the die cavity, and an open position creating a gap between the rotor core and the plurality of support shoes. The assembly has an injection system for filling at least one of the plurality of voids of the rotor core with a magnetic slurry, and a plurality of alignment magnets configured to align the magnetic slurry.

The above features and advantages, and other features and advantages, of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 1A is a schematic, side view of a die mechanism or assembly for forming a rotor with injection molded permanent magnets, illustrated during the forming process;

FIG. 1B is a schematic, top view of the die mechanism of FIG. 1A;

DETAILED DESCRIPTION

Figure 2:
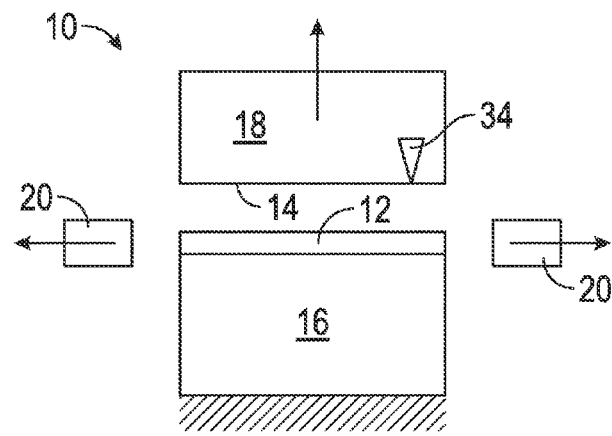
FIG. 2 is a schematic, side view of the die mechanism illustrated before or after the forming process shown in FIGS. 1A and 1B.

Referring to the drawings, like reference numbers correspond to like or similar components wherever possible throughout the several figures. FIG. 1A shows a highly-schematic side view of a die assembly 10, and FIG. 1B schematically shows the die assembly 10 from a top view with some of the components hidden. FIGS. 1A and 1B generally illustrate the die assembly 10 during a process for forming a rotor 12.

FIG. 2 shows a highly-schematic side view of the die assembly 10, similar to the view shown in FIG. 1A. However, in FIG. 2, the die assembly 10 is shown before or after forming the rotor 12—and possibly between cycles of forming multiple rotors 12. The drawings will be referred to interchangeably herein.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description.

The die assembly 10 may include one or more components defining or forming a die cavity 14 in which the rotor 12 is formed. A static platen 16 and a dynamic platen 18 form or define lower and upper portions of the die cavity 14, respectively, as viewed in FIG. 1A. A plurality of support shoes 20 also form or define the die cavity by variably defining the outer diameter of the die cavity 14.

The dynamic platen 18 moves or retracts to allow insertion of components, such as a rotor core 22, used to form the rotor 12 and subsequent removal of the rotor 12 following processing. The support shoes 20 are also movable—radially, relative to the rotor 12—to facilitate removal of the fully or partially formed rotor 12. Therefore, the static platen 16 and the dynamic platen 18 form the axial boundaries of the die cavity 14 and the support shoes 20 selectively form the radial boundaries of the die cavity 14.

FIGS. 1A and 1B show the support shoes 20 forming the outer diameter of the die cavity 14, which may be referred to as a closed position of the support shoes 20, and FIG. 2 shows the support shoes 20 retracted, which may be referred to as an open position of the support shoes 20. FIG. 1A shows the dynamic platen 18 in position to define the upper portion of the die cavity 14 and FIG. 2 shows the dynamic platen 18 retracted. Note that the static platen 16 may also be moveable and may be mounted on structures configured to absorb shock as the dynamic platen 18 is used to apply pressure to the rotor core 22.

Operation of the die assembly 10 to form the rotor 12 will now be described. Note that both the die assembly 10 and the rotor 12 are illustrative only and are used herein to illustrate or describe methods for making similar rotors.

The process of forming the rotor 12 may begin with forming the rotor core 22. As best viewed in FIG. 1B, the rotor core 22 includes the plurality of voids 24 and a central hole 26, about which the rotor 12 will rotate when used with an electric machine (not shown).

The rotor core 22 may be formed from different types of steel or from powdered metal materials. The rotor core 22 may be formed or made by stamping, casting, machining, other suitable manufacturing methods, or combinations thereof. The rotor core 22 shown may be only one lamination or layer, which will subsequently be stacked (axially) with other rotor cores 22 to form a multi-layer version of the rotor 12. Alternatively, multiple rotor cores 22 may be placed into the die cavity 14 and then simultaneously processed to form the rotor 12.

The plurality of support shoes 20 may be moved radially inward to form or define the outer diameter of the die cavity 14, which places the plurality of support shoes 20 into the closed position, before or after the rotor core 22 is placed into the die assembly 10. Therefore, an inner diameter of the plurality of support shoes 20 is substantially equivalent to an outer diameter of the rotor core 22 when the plurality of support shoes are in the closed position. After the formed rotor core 22 is placed into the die assembly 10, the dynamic platen 18 may be lowered to substantially fully form or define the die cavity 14.

As used herein, the terms substantially or substantially equal refer to quantities, values, or dimensions that are within manufacturing variance or tolerance ranges of being perfectly equal. Substantially equal dimensions, for example, may be planned as ideally equal but normal manufacturing tolerances may cause the resulting dimensions to vary by 10-20% for different pieces. Alternatively, normal manufacturing variances may be incorporated into component sizes, such that allowances are designed into the components.

The die assembly 10 then begins processes of forming a plurality of permanent magnets 30 within at least some of the plurality of voids 24. As shown in FIG. 1B, there are both filled voids 24 and unfilled voids 24.

The rotor 12 is generally symmetric about its axis or rotation (through the center of the hole 26) and the voids 24 are generally arranged in pole sets 32. The voids 24 are generally symmetric within the pole sets 32 and the pole sets 32 are generally symmetric about the rotor core 22. However, the rotor 12 need not be symmetric and may have asymmetric features or groups of features.

In the illustrative embodiment shown, there are eight pole sets 32 and each pole set 32 includes eight permanent magnets 30. However, more or fewer pole sets 32 may be used with the rotor 12. The permanent magnets 30 are generally arranged on either side of the center of the pole sets 32, such that four permanent magnets 30 are on each side of the respective pole set 32 with four unfilled voids 24 between the permanent magnets 30 filling the remaining voids 24 of the pole set 32.

The permanent magnets 30 are injection molded into the voids 24 of the rotor core 22. The die assembly 10, such as through an injection mechanism 34 in either the static platen 16 or the dynamic platen 18, injects at least one of the plurality of voids 24 with a magnetic slurry, depending on which of the voids 24 will be filled and turned into permanent magnets 30. The magnetic slurry may be formed from a combination of materials, including, but not limited to, magnetic particles dispersed within a polymer, which will then be formed into the permanent magnets 30.

For example, each of the permanent magnets 30 may include a plurality of magnetic particles dispersed within a polymer. The plurality of magnetic particles may have any shape, including, without limitation: flakes, chips, powder, spheres, and combinations thereof. The particle size may be chosen based upon the rotor 12 or the electric machine, but may have, without limitation, a particle size of from about ten microns to about forty microns. Such particle size allows for adequate dispersal of the plurality of magnetic particles within the polymer, and allows the magnetic particles to rotate within the polymer, as set forth in more detail below.

Each magnetic particle has a magnetic moment that may permanently aligned along a magnetic field. By way of general explanation, the magnetic moment of each magnetic particle is a vector that characterizes the overall magnetic properties of the magnetic particle and is a measure of a tendency of the magnetic particle to align with the magnetic field. The magnetic moment has both a magnitude and direction.

Suitable magnetic particles include, but are not limited to, ferromagnetic materials. Some specific ferromagnetic materials include, but are limited to, iron, nickel, cobalt, lodestone, alloys of rare earth metals (i.e., scandium, yttrium, and the fifteen lanthanides including the fourteen elements having atomic numbers 58 through 71 and lanthanum), and combinations thereof. In one configuration, the plurality of magnetic particles may be formed from neodymium with a three component system in which iron and boron have been added to neodymium (Nd—Fe—B), a samarium-cobalt magnet made of a two-component system alloy of samarium and cobalt (Sm—Co), and/or a samarium-iron-nitrogen system (Sm—Fe—N).

The magnetic particles may be randomly dispersed within the polymer so that the magnetic particles are spaced apart from one another. Therefore, the resulting permanent magnet 30 may be a random combination or mixture of the magnetic particles and the polymer so that some of the magnetic particles are spaced closer to adjacent magnetic particles than others. Alternatively, the plurality of magnetic particles may be equally spaced throughout the polymer. It may be desirable to maximize a concentration of the magnetic particles within the polymer to provide the rotor 12 with improved magnetic properties and operating characteristics.

The polymer may be selected according to the desired application of the rotor 12 and the permanent magnets 30. For example, for automotive applications, the polymer may be selected to be suitable for operating temperatures of from about −75 C to about 180 C. The polymer may have a melting point temperature of greater than about 300 C. Further, the polymer may be selected to have suitable viscosity so that the magnetic slurry may be injected into the selected voids 24 of the rotor 12. For example, the polymer may have a viscosity of from about 1,000 cP to about 10,000 cP at a temperature of 25 C.

The polymer may be cured via an activation catalyst, an increase or decrease in temperature, or by any suitable curing mechanism recognizable by one skilled in the art. Suitable polymers include, but are not limited to, thermoplastic polymers, thermoset polymers, and combinations thereof. More specifically, the polymer may be selected from nylon, polyphenylenesulfide, ethylene-ethylacrylate, polyesters, polyesteramides, epoxies, polyimides, and combinations thereof.

During injection of the magnetic slurry into the voids 24, the die assembly 10 applies substantial pressure to at least the portion of the rotor core 22 adjacent the voids 24 having the magnetic slurry injected therein. This pressure may cause the areas of the rotor core 22 around the voids 24 to deform outward. However, the support shoes 20 provide resistance to deformation at the outer diameter of the rotor core 22 by reinforcing the die cavity 14.

In the configuration shown, the plurality of support shoes 20 generally correspond to the pole sets 32, both in number and location relative to the rotor core 22. However, fewer or additional support shoes 20 may be used, so long as the outer diameter of the rotor core 22 and the die cavity 14 are supported. The configuration shown in FIG. 1B may be advantageous for retracting the plurality of support shoes 20, when compared to, for example, two support shoes 20, each of which covers half of the outer diameter.

As shown, the majority of the arc of the shoes 20 contacting the rotor core 22 moves radially away from the outer diameter of the formed rotor 12. However, if only two of the support shoes 20 surrounded the entire outer diameter of the rotor 12, much of those support shoes 20 would be moving laterally to the outer diameter of the rotor 12 and may drag or rub at the outer diameter of the rotor 12 as the support shoes 20 retract.

During injection of the magnetic slurry, and before the magnetic slurry has cured or solidified and formed the permanent magnets 30, a magnetic field is applied to align the magnetic particles within the magnetic slurry. In the configuration shown, the magnetic field is applied by alignment magnets 40 disposed within the support shoes 20. The alignment magnets 40 may be removable from the plurality of support shoes 20 to allow replacement of the alignment magnets 40 or switching between different types, shapes, or strengths. Furthermore, the alignment magnets 40 shown may be representative of electromagnets configured to selectively apply the magnetic field.

In general, the permanent magnets 30 within the voids 24 have been formed after application of pressure and application of the magnetic field (by the alignment magnets 40 or other field generators) to the magnetic slurry. Following forming of the permanent magnets 30, the rotor 12 may be removed from the die cavity 14 with the permanent magnets 30 embedded therein. Generally, the support shoes 20 will be retracted away from the rotor core 22 before the rotor 12 is removed from the die assembly 10.

The permanent magnets 30 of the rotor 12 may also be formed in multiple steps or stages. In a first stage, the die assembly 10 may inject only a first portion of the plurality of voids 24 to form only a first permanent magnet 30 set. In a second stage, the die assembly 10 may then inject a second portion, which is different from the first portion, of the plurality of voids 24 with the magnetic slurry to form a second permanent magnet 30 set. For example, and without limitation, half of the pole sets 32 may be formed in the first stage and the remaining half formed in the second stage or subsequent stages. Alternatively, a portion, such as the right half of each pole set 32 may be formed in the first stage and then the remaining portion formed in the second stage.

In an alternative process using an alternative die assembly (not shown), the support shoes 20 are not included. Instead the rotor core 22 is placed within a continuous ring or within rigid die cavity formed within the static platen 16, either of which would define the outer diameter of the die cavity 14. Such an alternative process would not require any movement other than the dynamic platen 18. The continuous ring may be a thin ring or a thick ring.

However, in the alternative process, any deformation in the rotor core 22—particularly that occurring in the area of the voids 24—may cause the outer diameter of the rotor core 22 to become pressed against the continuous ring, which is designed to limit the outer diameter of the die cavity 14. It may become difficult to remove the formed rotor 12 from the continuous ring and, in some circumstances, removal may damage the rotor 12.

Figure 3A:
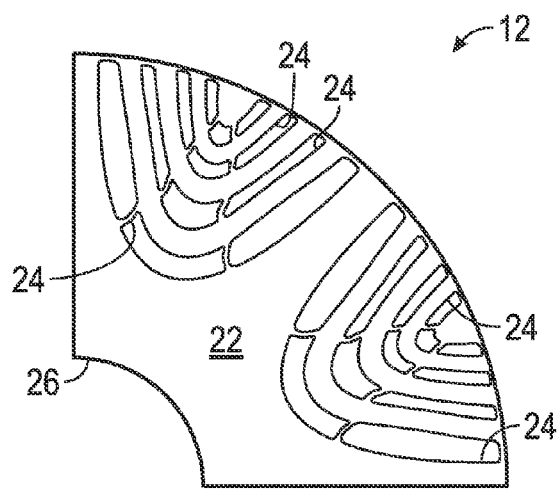
FIG. 3A is a schematic view of deformation analysis performed on a rotor produced with the die assembly shown in FIGS. 1A, 1B, and 2.
Figure 3B:
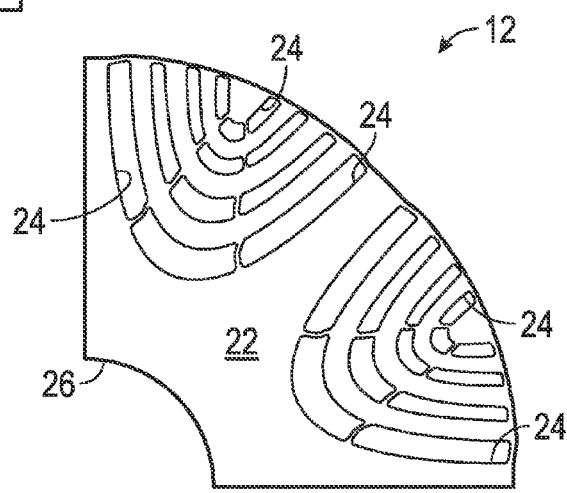
FIG. 3B is a schematic view of deformation analysis performed on a rotor produced with an alternative die assembly using a continuous ring outer diameter support.

Referring now to FIG. 3A and FIG. 3B, and with continued reference to FIGS. 1A, 1B, and 2, there is shown comparative analysis of the rotor 12 formed or produced by two different processes and die mechanisms. FIG. 3A shows deformation analysis of the rotor 12 produced within the die assembly 10 shown and described herein using the support shoes 20 to define the outer diameter of the die cavity 14. FIG. 3B shows the rotor 12 having been formed with the alternative process using a continuous ring as the outer diameter of the die cavity 14.

Note that the FIGS. 3A and 3B are not drawn to the same scale and that the amount of physical deformation is overstated to better illustrate where the deformation is occurring in each process. In the analysis illustrated by FIG. 3A, the maximum deflection of the rotor 12 produced with the support shoes 20 was approximately 0.013 millimeters. Most of the deformation, which is over-stated for illustrative purposes, in FIG. 3A is in the connections between the voids 24.

However, as illustrated in FIG. 3B, the rotor 12 produced by the alternative process with the continuous ring had maximum deformation of approximately 0.126 millimeters. The added deflection or deformation of the alternative process leads to both variance in the final rotor 12 and to increased difficulty in removing the rotor 12 from the continuous ring of the die mechanism.

Increasing the thickness, strength, or rigidity of the continuous ring used in the alternative process may limit the amount of deformation experienced by the rotor core 22. However, the deformation is limited by contact between the continuous ring and the outer diameter of the rotor core 22, and that contact results in difficulty removing the rotor 12 from the continuous ring and the die mechanism associated therewith. Variance along the outer diameter of the rotor 12, or other damage resulting from removal, such as warping of the rotor 12, may result in operating problems when the rotor 12 is used in an electric machine.

Even with a highly rigid continuous ring, the dimensional variation of the outer diameter of the rotor core 22 and inner diameter of the continuous ring would require some clearance between the two before injection of the magnetic slurry. After injection and application the associated pressure, the rotor 12 would grow to at least the amount of the clearance needed for manufacturing variance. Therefore, regardless of the rigidity (or size) of the continuous ring, it is very likely that there would be contact between the rotor 12 and the die assembly 10 following injection of the permanent magnets 30. Contact between the rotor 12 and the outer ring may result in damage during removal of the rotor 12.

Contrarily, as illustrated in FIG. 3A, the support shoes 20 in the die assembly 10 provide high resistance to deformation at the outer diameter of the rotor core 22 during forming of the permanent magnets 30. Furthermore, the radial retraction provided by the support shoes 20 in the die assembly 10 also allows the retraction of the outer diameter of the die cavity 14 and removal of the rotor 12 with significantly reduced likelihood of damage to the rotor 12.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. A method for forming a rotor, comprising:
    forming a rotor core having a plurality of voids;
    placing the formed rotor core into a die cavity;
    moving a plurality of support shoes to define an outer diameter of the die cavity;
    injecting at least one of the plurality of voids with a magnetic slurry;
    forming at least one permanent magnet from the injected magnetic slurry within the at least one of the plurality of voids by:
        applying pressure to the rotor core and the magnetic slurry within the die cavity; and
        applying a magnetic field to align the magnetic slurry;
    retracting the plurality of support shoes; and
    removing the rotor core with the at least one permanent magnet.

2. The method of claim 1, wherein the magnetic field is applied by permanent magnets disposed within the plurality of support shoes.

3. The method of claim 2, wherein the permanent magnets are removable from the plurality of support shoes.

4. The method of claim 3, wherein injecting the at least one of the plurality of voids with the magnetic slurry includes injecting a first portion of the plurality of voids, and wherein forming the at least one permanent magnet includes forming a first permanent magnet set within the first portion of the plurality of voids, and further comprising:
    injecting a second portion of the plurality of voids, different from the first portion of the plurality of voids, with the magnetic slurry; and
    forming a second permanent magnet set within the second portion of the plurality of voids.

5. The method of claim 1, wherein injecting the at least one of the plurality of voids with the magnetic slurry includes injecting a first portion of the plurality of voids, and wherein forming the at least one permanent magnet includes forming a first permanent magnet set within the first portion of the plurality of voids, and further comprising:
    injecting a second portion of the plurality of voids, different from the first portion of the plurality of voids, with the magnetic slurry; and
    forming a second permanent magnet set within the second portion of the plurality of voids.

* * * * *